Patented Jan. 14, 1941

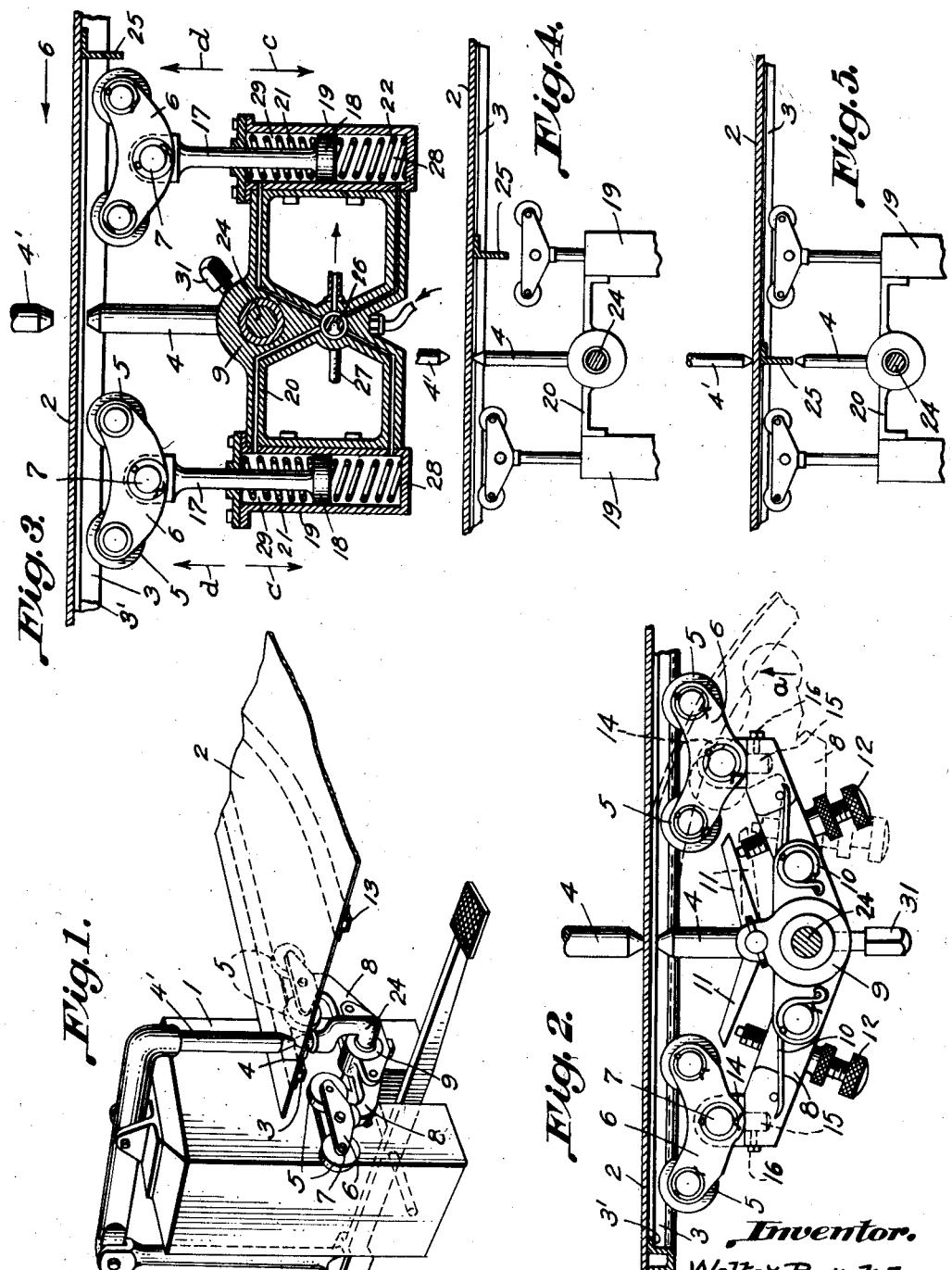

2,228,867

UNITED STATES PATENT OFFICE 2,228,867

WELDING DEVICE

Walter Borstel, Dessau-Siedlung, Germany, assignor to Junkers Flugzeug-und-Mortorenwerke Aktiengesellschaft, Dessau, Germany Application July 21, 1938, Serial No 220,528
In Germany July 23, 1937

13 Claims. (Cl. 219—4)

My invention relates to the art of connecting structural parts by welding, more especially resistance welding such as spot welding. It has particular reference to the production of welding connections extending along a straight or curved line, and it is an object of my invention to provide means, whereby such connections can be produced in a simpler and more reliable way than was hitherto possible.

When connecting two structural parts by resistance and more especially by spot welding it frequently happens that the points of connection must be arranged along a line the configuration of which is determined by the configuration of one or both parts to be connected. For instance if a piece of sheet metal is to be connected with a bracing member such as an angle-iron or a channel extending thereon, this member is first attached to the sheet metal with the aid of a few screw bolts, clamps or the like, and the two parts are then fixed to each other on the welding machine. They are introduced between the electrodes of the machine and, after having been connected by welding at one point, are advanced along the line determined by the welding points, until the next welding point lies between the electrodes. When thus shifting the workpieces it frequently occurs that the direction, in which they are shifted, does not coincide exactly with the desired direction so that the welds would not be correctly located. Therefore, in order to obtain the correct position of the welds, hitherto the workpieces to be connected had to be shifted relative to the welding machine with particular and time-consuming care.

In accordance with this invention I succeed in connecting two metal parts by welding in such manner that the welds are always arranged on the prescribed line without any particular care being required. I provide in connection with the welding machine means for guiding the workpieces during their travel across the machine and with the aid of these guiding means I succeed in making the welding spots coincide exactly with the line on which they should be arranged.

If this line extends parallel merely with the side or edge of one of the two parts to be connected, it may suffice to move that edge of the part along the guiding means. I may also form the workpiece with a notch or projection serving to guide it properly in contact with the guiding means. If the workpiece should be unsuitable to be guided, either owing to the thinness of its walls or for other reasons, I may employ in contact with the guiding means of the welding machine, a guide member specially connected for this purpose with the workpiece.

The lines along which the welding joints shall extend may be of any configuration, either straight or curved, and the surfaces on which these lines extend, may also be shaped in any manner, extending for instance in a plane or two angularly abutting planes, or they may be curved or arched. The guiding means may be arranged for adjustment in such manner that they enable the workpieces to be guided along a straight as well as a curved line.

Guiding means such as guide rollers or the like may be connected with one of the welding electrodes, preferably the stationary electrode. I prefer providing a plurality of such guiding means on either side of the electrode, arranged along a line determined by the welding points, in order to thus obtain a safe guidance.

If one of the two parts to be connected serves for guiding the workpieces, means may be provided for producing two rows, arranged in spaced relation, of welded joints without it being necessary to turn the workpieces over.

Means may further be provided for readily shifting the two parts to be connected from one welding point to the next in the case where one of the two parts to be welded is provided with projections such as for instance bracing ribs, which extend across the line of welds and which, when the workpieces being shifted in the machine, might contact the guiding means or one of the electrodes.

In the drawing affixed to this specification and forming part thereof two welding devices embodying my invention are illustrated diagrammatically by way of example.

In the drawing

Fig. 1 is a perspective view of a spot welding machine fitted with guiding means according to this invention, Fig. 2 being a side elevation of the guiding means and electrodes during the welding process.

Fig. 3 is a similar view of another embodiment, partly in longitudinal section, while Figs. 4 and 5 are similar side elevations, drawn to a smaller scale, of the device shown in Fig. 3, with the parts illustrated in different working positions.

In all the figures a sheet metal plate 2 is shown in the course of being connected, by welding, with profiled bracing members 3 and 13, respectively.

Referring to the drawing and first to Figs.

1 and 2, 4, 4' are the welding electrodes superposed in axial alignment and 5, 5 are guide rollers formed with grooves corresponding to the cross section of the bracing members 3 and 13 to be fixed on the sheet metal plate. By projecting into the grooves of these rollers the bracing members, which are connected with the plate by means of screws, clamps or the like, are guided exactly with respect to the electrodes 4, 4' of the welding machine along a line connecting the welding spots. The middle plane of the rollers is so spaced from the points of the electrodes that a flange-like face 3' of the members 3 extends in line with the electrode axis.

In the direction of travel of the workpiece pairs of guide rollers 5 are arranged in front and to the rear of the electrodes, in order to provide for a safe guidance of the workpiece relative to the electrodes if the welding spots, as shown in Fig. 1, approach the outer edge of the sheet metal plate.

The rollers 5 of each pair are supported by members 6 having the form of balance beams which are connected by means of an intermediate link 7 to rock arms 8. These rock arms are linked to the body 9 mounted on an arm 24 of the stationary electrode 4 and are acted upon by springs 10 tending to rock the arms 8 in the direction of the arrows $a$ and to thereby lift the workpiece 2, 3 off the electrode 4, but yielding somewhat under the pressure exerted, during the welding, on the workpiece by the movable electrode 4'. The rocking movement in the direction of the arrows $a$ is limited by adjustable stops 11 arranged on the body 9, against which set screws 12 carried by the rock arms bear 8, whenever the movable electrode 4' is lifted off the workpiece 2, 3. Thus, when the electrode is so lifted, the springs 10 cause the guide rollers 5 and the workpiece 2, 3 resting thereon to be shifted, so that the workpiece is lifted somewhat above the stationary electrode 4 and can now easily be transported on the guide rollers from the welding spot produced to the next following welding point.

If the part of the workpiece in contact with the guide rollers is so curved that the axis of curvature crosses the axis of the electrodes—as is shown in dash lines on the righthand half of Fig. 2—the rock arms 8 and stops 11 are adjusted correspondingly. In the case of curvatures of particularly great radii an adjustment of the set screw 12 will suffice to adapt the bearings of the guide rollers 5 to the curvature of the parts to be connected.

If the workpiece must be guided in a curve, the axis of which extends substantially parallel to the electrode axis—as is the case for instance when welding the channel 13 to the sheet metal plate 2 in Fig. 1—the guide rollers 5 must also be adjustable to correspond with the configuration of the member 13. To this end, the balance beams 6 are linked to an intermediate piece 14, which is formed with a journal 15 extending parallel to the electrode axis which projects into a bore of the rock arm 8 and can be fixed in position relative to the rock arm 8 by means of a set screw 16. After the screw 16 has been loosened, the guide rollers 5 can be adjusted in accordance with the curvature of the bracing member 13 by rocking them about the axis of the journal 15. In the case of irregular curvatures the set screws 16 are not screwed down, so that the guide rollers 5 are always free to adjust themselves accordingly.

In the embodiment shown in Figs. 3-5 provision is also made for enabling the guide rollers 5 to be shifted positively together or individually in the direction of movement of the electrodes 4, 4'. To this end, the balance beams 6, each of which carries a pair of rollers 5, are connected by means of rods 17 to plungers 18 reciprocable in cylinders 19, which are mounted on a supporting structure 20 fixed on an extension 24 of the stationary electrode 4. On either side of the plungers 18 are arranged coil springs 21, 22 acting in opposite directions so that, if the movable electrode 4' is lifted off the workpiece (as shown in Fig. 3), the workpiece is lifted somewhat above the stationary electrode 4 by the springs 22. On the electrode 4' being lowered, its pressure overcomes the pressure of the springs 22 and forces the workpiece against the stationary electrode 4.

If a bracing member or the like such as 25 extends on the workpiece in a direction such that during the normal displacement of the workpiece from one to the other welding point it would meet the guide rollers 5 or the stationary electrode 4, provision may be made for so displacing the rollers and the workpiece that neither the rollers nor the electrodes project into the path of the member 25. For instance if the plate 2 in Fig. 3 shall be displaced in the direction of the arrow 6, first the rollers 5 on the right of the electrode 4 are adjusted in the direction of the arrow $c$, so as not to hinder the displacement of the workpiece (Fig. 4). In order now to avoid the member 25 meeting the stationary electrode 4, the guide rollers 5 on both sides of the electrodes are displaced together in the direction of the arrows $d$, whereby the workpiece 2, 3 and 25 is removed so far from the stationary electrode 4 that, when it is shifted further in the direction of arrow $b$, the electrode 4 does not project into the path of the part 25 (Fig. 5).

In the embodiment according to Figs. 3-5 the displacement of the guide rollers 5 in the direction of the arrows $c$ and $d$ is effected by means of a pressure medium such as compressed air or a liquid under pressure, which can be fed by means of a valve 26 adjustable by means of a lever 27 either to one or simultaneously both of the cylinder compartments 28, 29 arranged on both sides of the plungers 18. For instance, in order to effect a displacement according to Fig. 4, the pressure medium will be fed only to the top compartment 29 of the cylinder on the righthand side, while in the case of Fig. 5 it will be fed to the bottom compartments 28 of both cylinders. The plungers 18 are returned into the inoperative position shown in Fig. 3 by one of the two springs 21, 22.

The displacement of the guide rollers 5 can also be effected in any other manner, for instance by means of hand levers, a toothed gear, a screw gear or the like.

If it is desired to produce welded seams arranged in closely spaced parallel relation, in order for instance to connect both flanges of a symmetrically formed bracing member 3 or 13 with the sheet metal plate 2 without the workpiece being required to be turned around, the guide rollers 5 are arranged for displacement transversely to the axial movement of the electrodes 4 and 4'. To this end the body 9 in the embodiment shown in Figs. 1 and 2 is arranged for removal and attachment to the part 24 by means of the set screw 31. Similarly in the embodiment of Figs. 3-5 the supporting structure 20 can be removed from the part 24 extending across it and carrying the electrode 4 and may also be fixed thereon by means of a set screw 31. By displacing the bodies 9 or 20 on the part 24 it is possible to connect either one or the other flange of the bracing members 3 and 13 with the sheet metal plate 2 by spot welding.

By guiding the workpiece in contact with the guide rollers 5 I obtain the guaranty that the welding spots coincide exactly with the line on which the welding points shall be arranged, without being required to operate with particular care.

I wish it to be understood that I do not desire to be limited to the exact details of construction shown and described, for obvious modifications will occur to a person skilled in the art, i. e. the device may be applied to automatic riveting machines.

I claim:

1. A work support and guide mechanism for a spot welding or riveting machine comprising grooved rollers disposed on opposite sides of the point of work joinder, said rollers being mounted for swinging movement in a horizontal plane and vertical movement with reference to the work, means for limiting the extent of said vertical movement, and means for displacing either of said rollers independently or both simultaneously in said vertical direction.

2. A work support and guide mechanism for a spot welding or riveting machine comprising arms disposed on opposite sides of the point of work joinder, and yieldable means carried by said arms for supporting the work out of contact with the work contacting parts of said machine during movement of the work relative thereto.

3. A work support and guide mechanism for a spot welding or riveting machine comprising arms disposed on opposite sides of the point of work joinder, and yieldable means carried by said arms for supporting the work out of contact with the work contacting parts of said machine during movement of the work relative thereto, said means comprising guide rollers disposed adjacent the extremity of each arm and pivoted for rotation in a plane substantially parallel to the work.

4. Mechanism of the class described comprising an electrode, an oppositely disposed cooperating electrode, a carrying member disposed at a point removed from the end of one electrode and supporting the same, and work supporting and positive guide means positioned by said carrying member on opposite sides of said electrode, said last-mentioned means being rotatable about an axis parallel to its adjacent electrode.

5. Mechanism of the class described comprising a fixed electrode, an oppositely disposed alined electrode reciprocable toward and away therefrom, a carrying member disposed at a point removed from the end of the fixed electrode and supporting the same, and a work supporting and positive guide means positioned by said carrying member on opposite sides of said fixed electrode, said last-mentioned means being rotatable about an axis parallel to said fixed electrode.

6. Mechanism of the class described comprising a fixed electrode, an oppositely disposed reciprocating electrode, a carrying member disposed at a point remote from the end of the fixed electrode and supporting the same, said member being adjustable transversely of the axis of the fixed electrode, and work supporting and positive guide means positioned by said carrying member on opposite sides of the fixed electrode, said last-mentioned means being rotatable about an axis parallel to said fixed electrode.

7. Mechanism of the class described comprising a fixed electrode, an oppositely disposed cooperating electrode, a carrying member disposed at a point remote from the end of the fixed electrode and supporting the same, and work supporting and positive guide means positioned by said carrying member on opposite sides of said electrode, said means comprising grooved rollers pivoted for free rotation about an axis parallel to the fixed electrode.

8. Mechanism of the class described comprising a fixed electrode, an oppositely disposed cooperating electrode, a carrying member disposed at a point remote from the end of the fixed electrode and supporting the same, and work supporting and positive guide means positioned by said carrying member on opposite sides of said electrode, said means comprising grooved rollers mounted for free rotation about an axis parallel to the fixed electrode and limited movement in a direction parallel to the axis of said fixed electrode.

9. Mechanism of the class described comprising a fixed electrode, an oppositely disposed cooperating electrode, a carrying member disposed at a point remote from the end of the fixed electrode and supporting the same, work supporting and positive guide means positioned by said carrying member on opposite sides of said electrode, said means comprising grooved rollers mounted for free rotation about an axis parallel to the fixed electrode and limited movement in a direction parallel to the axis of said fixed electrode, and means for moving either or both of said guide rollers in said last-mentioned direction.

10. A device for forming a permanent juncture, as by riveting or welding, between initially assembled parts and including oppositely disposed operating members capable of forming a joint between said parts, at least one of said members being movable toward and away from the other into and out of contact with the work assembly, a carrier disposed at one side of the space between said members, and means for supporting and positively guiding said work assembly positioned by said carrier on opposite sides of one of said members, said means being rotatable about an axis parallel to the direction of relative movement between said operating members.

11. A device for forming a permanent juncture, as by riveting or welding, between initially assembled parts and including oppositely disposed operating members capable of forming a joint between said parts, at least one of said members being movable toward and away from the other into and out of contact with the work assembly, a carrier movable transversely to the direction of movement of said members and disposed at one side of the space between said members, and means for supporting and positively guiding said work assembly positioned by said carrier on opposite sides of one of said members, said means being rotatable about an axis parallel to the direction of relative movement between said operating members.

12. A device for forming a permanent juncture, as by riveting or welding, between initially assembled parts and including oppositely disposed operating members capable of forming a joint between said parts, at least one of said members being movable toward and away from the other into and out of contact with the work assembly, a carrier disposed at one side of the space between said members, and means for supporting and positively guiding said work assembly positioned by said carrier on opposite sides of one of said members, said means being freely rotatable about an axis parallel to the direction of relative movement between said operating members and movable within definite limits parallel to said direction of relative movement.

13. A device for forming a permanent juncture, as by riveting or welding, between initially assembled parts and including oppositely disposed operating members capable of forming a joint between said parts, at least one of said members being movable toward and away from the other into and out of contact with the work assembly, a carrier disposed at one side of the space between said members, means for supporting and positively guiding said work assembly positioned by said carrier on opposite sides of one of said members, said means being freely rotatable about an axis parallel to the direction of relative movement between said operating members and movable within definite limits parallel to said direction of relative movement, yielding means locating said support and guide means at a neutral position within its limits of movement in said last-mentioned direction, and positive means for actuating the same independently or simultaneously in either direction.

WALTER BORSTEL.